(12) United States Patent
Kwag et al.

(10) Patent No.: US 8,530,017 B2
(45) Date of Patent: Sep. 10, 2013

(54) METHOD FOR PREPARING STYRENE-BUTADIENE COPOLYMER USING REACTIVE EMULSIFIER AND STYRENE-BUTADIENE COPOLYMER PREPARED BY THE SAME

(75) Inventors: Gwanghoon Kwag, Daejeon (KR); Dong Hyuk Na, Daejeon (KR); Jun Keol Choi, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 13/167,073

(22) Filed: Jun. 23, 2011

(65) Prior Publication Data
US 2012/0164363 A1  Jun. 28, 2012

(30) Foreign Application Priority Data
Dec. 27, 2010  (KR) .................. 10-2010-0135938

(51) Int. Cl.
*B32B 1/08* (2006.01)
*C08F 236/14* (2006.01)

(52) U.S. Cl.
USPC .......... 428/36.9; 525/287; 525/297; 525/293; 525/303; 525/304; 525/302; 524/547; 524/555; 524/556; 524/559

(58) Field of Classification Search
USPC ............. 428/36.9; 525/287, 291, 293, 303, 525/304, 302; 524/547, 555, 556, 559
See application file for complete search history.

(56) References Cited

U.S. PATENT DOCUMENTS

| | | | |
|---|---|---|---|
| 3,563,946 A | 2/1971 | Miller et al. | |
| 3,575,913 A | 4/1971 | Meier | |
| 4,064,081 A | 12/1977 | McCoy et al. | |
| 5,274,027 A | 12/1993 | Guillaume et al. | |
| 5,302,655 A | 4/1994 | Guillaume et al. | |
| 6,512,053 B1 * | 1/2003 | Colvin et al. | 525/243 |
| 6,716,925 B2 | 4/2004 | Thielen et al. | |
| 7,585,927 B2 | 9/2009 | Liu | |
| 2008/0245989 A1 * | 10/2008 | Miyawaki et al. | 252/62 |
| 2009/0286933 A1 | 11/2009 | Nagaishi et al. | |
| 2011/0034622 A1 * | 2/2011 | Kawamura et al. | 524/548 |

FOREIGN PATENT DOCUMENTS

| | | |
|---|---|---|
| JP | 08-333489 | 12/1996 |
| JP | 2003-119202 | 4/2003 |

* cited by examiner

*Primary Examiner* — Robert D. Harlan
(74) *Attorney, Agent, or Firm* — Frommer Lawrence & Haug LLP; Ronald R. Santucci

(57) ABSTRACT

Provided is a method for preparing a styrene-butadiene copolymer having improved silica affinity through introduction of a novel reactive emulsifier. The styrene-butadiene copolymer prepared according to the disclosed method has superior affinity for thereby and thus has superior processability and tensile properties and remarkably improved dynamic properties. Therefore, when the styrene-butadiene copolymer according to the present invention is used as a tire tread material, it can greatly improve its physical properties.

15 Claims, 10 Drawing Sheets

METHOD FOR PREPARING STYRENE-BUTADIENE COPOLYMER USING REACTIVE EMULSIFIER AND STYRENE-BUTADIENE COPOLYMER PREPARED BY THE SAME

CROSS-REFERENCE TO RELATED APPLICATIONS

This application claims priority under 35 U.S.C. §119 to Korean Patent Application No. 10-2010-0135938, filed on Dec. 27, 2010, in the Korean Intellectual Property Office, the disclosure of which is incorporated herein by reference in its entirety.

BACKGROUND (a) Technical Field

The present invention relates to a method for preparing a styrene-butadiene copolymer that can be used as an industrial material for tires, belts, hoses, etc., and a styrene-butadiene copolymer prepared by the same.

(b) Background Art

Styrene-butadiene copolymers or styrene-butadiene-polar monomer copolymers are mainly prepared by emulsion polymerization. These copolymers are used for tires, coating materials, toners, or the like. Several patents are disclosed about the techniques of preparing the styrene-butadiene copolymer or the styrene-butadiene-polar monomer copolymer by emulsion polymerization.

For example, U.S. Pat. Nos. 3,575,913 and 3,563,946 disclose preparation of a styrene-butadiene or styrene-butadiene-acrylate copolymer in emulsion state using potassium persulfate or azobisisobutyronitrile. U.S. Pat. No. 4,064,081 discloses emulsion polymerization of a butadiene-styrene copolymer using potassium persulfate as a polymerization initiator. U.S. Pat. Nos. 5,274,027 and 5,302,655 describe preparation of a styrene-butadiene-acrylate copolymer by emulsion polymerization from acrylate monomers such as itaconic acid, methyl methacrylate, etc., by using, for example, an ammonium persulfate initiator.

U.S. Pat. Nos. 6,512,053 and 6,716,925 describe preparation of a styrene-butadiene-acrylate copolymer by emulsion polymerization from hydroxyalkyl acrylate monomers such as 2-hydroxyethyl methacrylate, 2-hydroxypropyl methacrylate and hydroxymethylmethacrylamide, by using, for example, an ammonium persulfate initiator.

Those styrene-butadiene copolymers prepared by emulsion polymerization have poor affinity for silica and improvement of polarity is required to improve the affinity. However, since the vinyl carboxylic acid monomer is poorly reactive and interferes with micelle formation by changing acidity, there is a limitation in removing the residual monomers. In order to improve the silica affinity, it is required to increase the content of the polar monomer, which makes processing of the melt blend difficult. As a result, compound viscosity and hardness become very high.

Further, the functional monomers of the above-mentioned patents do not have emulsifying capability, and thus there is emulsion stability problem when the amount of the emulsifier is reduced.

In the tire industry, there is a growing need for the development of styrene-butadiene rubbers having polar groups and silica composites with a structure suitable for the manufacture of silica tires.

SUMMARY

The present invention is directed to providing a functional styrene-butadiene copolymer having improved silica affinity and blending property through polymerizing the styrene-butadiene copolymer by introducing a reactive emulsifier having a functional group, and a method for preparing the same.

In one general aspect, the present invention provides a method for preparing a styrene-butadiene copolymer by radical emulsion polymerizing a styrene monomer with a butadiene monomer using a functional reactive emulsifier represented by Chemical Formula 1, 2 or 3:

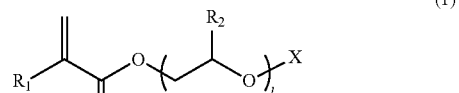

(1)

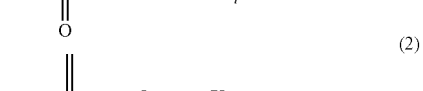

(2)

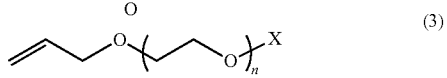

(3)

wherein each of $R_1$, $R_2$ and $R_3$ is independently hydrogen or a $C_1$-$C_6$ alkyl group, l is an integer from 1 to 20, m is an integer from 1 to 20, n is an integer from 1 to 20, and X is an amino group, an ammonium group, a hydroxyl group, a sulfonate group, a carboxylate group or a phosphate group.

In another general aspect, the present invention provides a styrene-butadiene copolymer prepared by the above method, which is represented by Chemical Formula 4, 5 or 6:

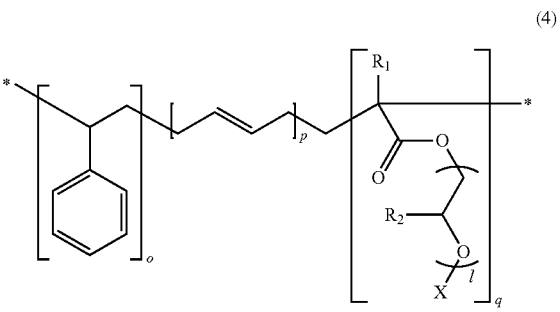

(4)

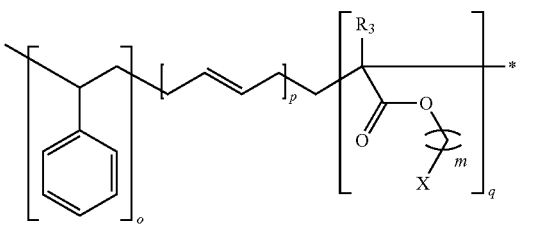

(5)

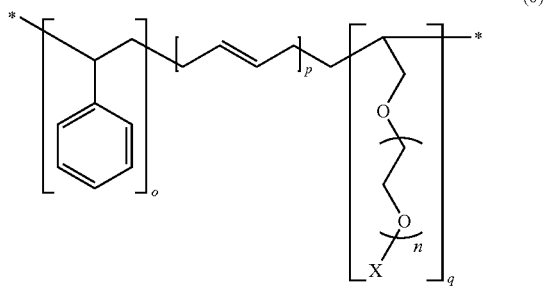

(6)

wherein each of $R_1$, $R_2$ and $R_3$ is independently hydrogen or a $C_1$-$C_6$ alkyl group, l is an integer from 1 to 20, m is an integer from 1 to 20, n is an integer from 1 to 20, X is an amino group, an ammonium group, a hydroxyl group, a sulfonate group, a carboxylate group or a phosphate group, o is from 0.1 to 0.5, p is from 0.40 to 0.85, q is from 0.01 to 0.10, and o+p+q=1.

The above and other aspects and features of the present invention will be described infra.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the disclosure, and wherein.

DETAILED DESCRIPTION

Figure 1:
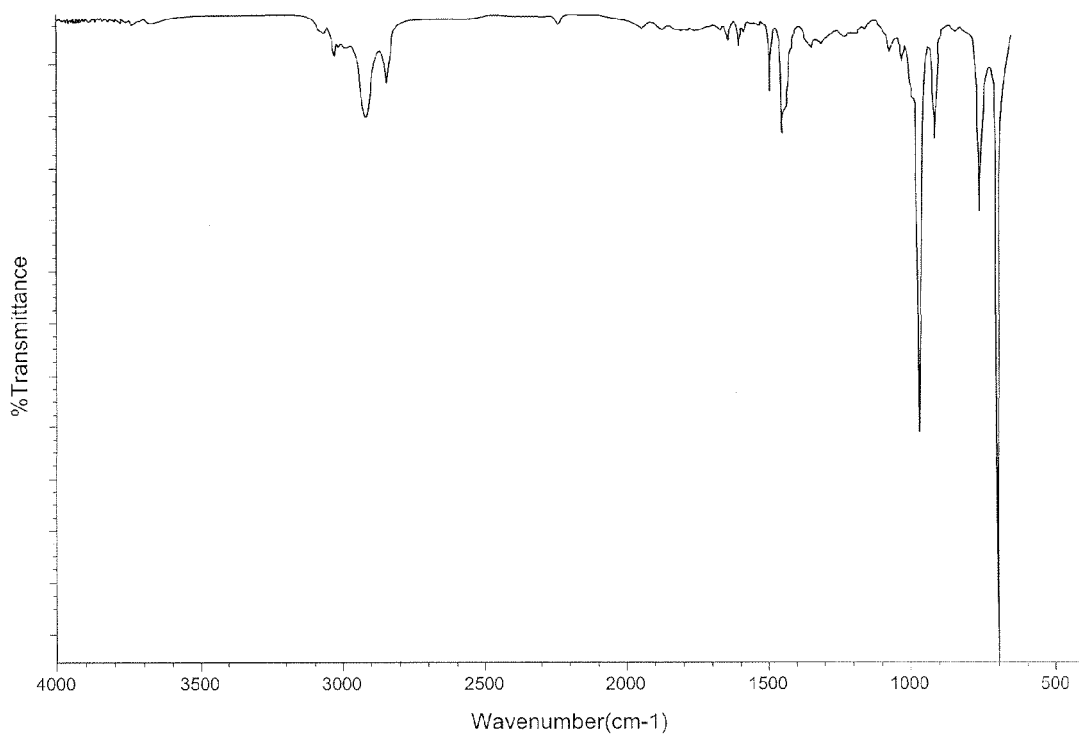
FIG. 1 shows an IR spectrum of a styrene-butadiene-methylcarboxylate methacrylate copolymer prepared in Example 1.

Hereinafter, reference will now be made in detail to various embodiments of the present invention, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present invention provides a method for preparing a copolymer by radical polymerizing a styrene monomer, a butadiene monomer and a reactive emulsifier in emulsion state, and a styrene-butadiene copolymer prepared therefrom.

The method for preparing a styrene-butadiene copolymer according to the present invention and the composition thereof will be described in detail.

First, among the monomers used in the polymerization, the styrene monomer may be one or more selected from styrene, a-methylstyrene, dimethylstyrene and halogenated styrene. It may be used in an amount of 10-50 wt % based on the weight of the total reactants (the styrene monomer, the butadiene monomer and the reactive emulsifier). When the amount is less than 10 wt %, mechanical properties including tensile property may be unsatisfactory. When the amount exceeds 50 wt %, elasticity and abrasion resistance may be unsatisfactory. Hence, the aforesaid range may be preferred.

The butadiene monomer may be one or more selected from 1,3-butadiene, isoprene and halogenated butadiene, and may be used in an amount of 45-85 wt % based on the weight of the total reactants. When the amount is less than 45 wt %, elasticity and abrasion resistance may be unsatisfactory. When the amount exceeds 85 wt %, mechanical properties including tensile property may be unsatisfactory. Hence, the aforesaid range may be preferred. In the resultant copolymer, the butadiene unit may have a trans or cis vinyl microstructure.

The reactive emulsifier is a functional, acrylate-based reactive emulsifier. It serves as emulsifier and also participates in the polymerization reaction.

The reactive emulsifier is represented by Chemical Formula 1, 2 or 3:

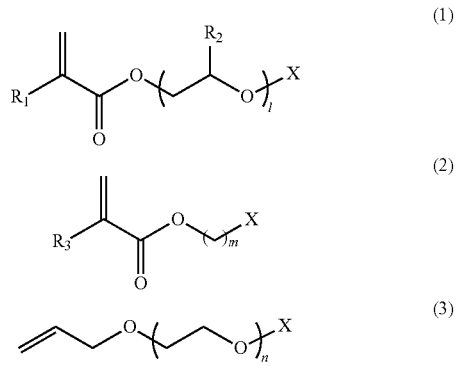

In Chemical Formulas 1 to 3, each of $R_1$, $R_2$ and $R_3$ is independently hydrogen or a $C_1$-$C_6$ alkyl group, l is an integer from 1 to 20, m is an integer from 1 to 20, n is an integer from 1 to 20, and X is an amino group, an ammonium group, a hydroxyl group, a sulfonate group, a carboxylate group or a phosphate group.

Specific examples of the reactive emulsifier include polyoxyethylene phosphate methacrylate, polyoxyethylene carboxylate methacrylate, polyoxyethylene sulfonate methacrylate, polyoxyethylene hydroxymethacrylate, polyoxyethylene glycol methacrylate, polyoxypropylene phosphate methacrylate, polyoxypropylene carboxylate methacrylate, polyoxypropylene sulfonate methacrylate, polyoxypropylene hydroxymethacrylate, polyoxypropylene glycol methacrylate, polyoxypropylene glycol phosphate acrylate polyoxyethylene phosphate acrylate, polyoxyethylene carboxylate acrylate, polyoxyethylene sulfonate acrylate, polyoxyethylene hydroxyacrylate, polyoxyethylene glycol acrylate, polyoxypropylene phosphate acrylate, polyoxypropylene carboxylate acrylate, polyoxypropylene sulfonate acrylate, polyoxypropylene hydroxyacrylate, polyoxypropylene glycol acrylate, allyl alcohol ethoxylate, allyl alcohol polyethylene oxide phosphate, alkylcarboxylate acrylate, alkylcarboxylate methacrylate, alkyl phosphate acrylate, alkyl phosphate methacrylate, alkylsulfonate acrylate, alkylsulfonate methacrylate, alkylhydroxy acrylate, and alkylhydroxy methacrylate (wherein each alkyl is $C_1$-$C_6$ alkyl). It may be used in an amount of 0.1-10 wt % based on the weight of the total reactants. When the amount is less than 0.1 wt %, it is difficult to confer hydrophilic property to the styrene-butadiene copolymer. When the amount exceeds 10 wt %, elasticity may decrease and processability may be unsatisfactory due to increased hardness.

In the radical emulsion polymerization, a radical initiator commonly used in the related art may be used as an initiator. Specifically, one or more selected from the initiator systems commonly used in emulsion polymerization, e.g., persulfate such as potassium persulfate and ammonium persulfate, acetylacetone peroxide, benzyl peroxide, dicumyl peroxide, methane hydroperoxide, 2,4-dichlorobenzyl peroxide, t-butyl peracetate, 2,2'-azobis(isobutyramidine)dihydrochloride, azobisisobutyronitrile, hydrogen peroxide, redox system and ferrous sulfate, may be used. When preparing the styrene-butadiene copolymer according to the present invention, the radical initiator may be used in an amount of 0.05-3 parts by weight based on 100 parts of the total reactants by weight. When the radical initiator is used in an amount less than 0.05 part by weight, polymerization may not proceed sufficiently. On the contrary, if it is used in excess of 3 parts by weight, molecular weight may decrease.

The reactive emulsifier may be used alone or in admixture with one or more anionic, cationic or non-ionic surfactant. Specifically, the surfactant may be one or more selected from a metal salt and an ammonium salt. Specifically, one or more selected from an alkyl sulfate metal salt, an alkylallylsulfonic acid metal salt, an alkyl phosphate metal salt, an alkyl sulfate ammonium salt, an alkylallylsulfonic acid ammonium salt, an alkylarylsulfonic acid ammonium salt, an allylsulfonic acid ammonium salt, an alkyl phosphate ammonium salt, an alkylcarboxylate metal salt, an alkylcarboxylate ammonium salt, a polyoxyethylene phosphate metal salt, a polyoxyethylene phosphate ammonium salt, a polyoxyethylene sulfate metal salt, a polyoxyethylenesulfonic acid metal salt, a polyoxyethylene sulfate ammonium salt, a polyoxyethylenesulfonic acid ammonium salt, a polyoxyethylene carboxylate metal salt, a polyoxyethylene carboxylate ammonium salt, a polyoxypropylene phosphate metal salt, a polyoxypropylene phosphate ammonium salt, a polyoxypropylene sulfate metal salt, a polyoxypropylenesulfonic acid metal salt, a polyoxypropylene sulfate ammonium salt, a polyoxypropylenesulfonic acid ammonium salt, a polyoxypropylene carboxylate metal salt, a polyoxypropylene carboxylate ammonium salt, an allyl alcohol ethoxylate metal salt, an allyl alcohol ethoxylate ammonium salt, an allyl alcohol polyethylene oxide phosphate metal salt, and an allyl alcohol polyethylene oxide phosphate ammonium salt may be used. More specifically, one or more selected from dodecylbenzenesulfonic acid, rosin acid, fatty acid, lauryl sulfonic acid and hexadecylsulfonic acid may be used. Here, each of the alkyl, allyl and aryl may have 4-20 carbon atoms. When the number of carbon atoms is smaller than 4, dispersing may be insufficient. On the contrary, if it exceeds 20, hydrophilicity may decrease. Hence, the aforesaid range may be preferred. The surfactant may be used in an amount of 0.1-10 parts by weight based on 100 parts of the total reactants by weight. When the surfactant is used in an amount less than 0.1 part by weight, micelles may not form. On the contrary, if it is used in excess of 10 parts by weight, microemulsion may be formed, thus resulting in a small molecular weight.

When preparing the styrene-butadiene copolymer, a $C_8$-$C_{20}$ mercaptan-based compound may be used as molecular weight control agent. Specifically, one or more selected from octyl mercaptan, decyl mercaptan, dodecyl mercaptan and hexadecyl mercaptan may be used. The average molecular weight of the styrene-butadiene copolymer may be controlled by controlling the amount of the molecular weight control agent. When the mercaptan-based molecular weight control agent is used in an amount of 0.001-0.02 parts by weight based on 100 parts of the total reactants by weight, a styrene-butadiene copolymer having a large molecular weight may be prepared. When it is used in an amount of 0.5-2 parts by weight, a styrene-butadiene copolymer having a small molecular weight may be prepared. When the mercaptan-based molecular weight control agent is used in an amount less than 0.001 part by weight, gelation may occur. On the contrary, if it is used in excess of 2 parts by weight, physical properties may be unsatisfactory. Hence, the aforesaid range may be preferred.

When preparing the styrene-butadiene copolymer, diethylhydroxyamine, N-isopropylhydroxyamine, monoethylhydroxyamine, sodium dimethyldithiocarbamate, or the like may be used as a polymerization terminator. Specifically, the polymerization terminator may be used in an amount of 0.01-2 parts by weight based on 100 parts of the total reactants by weight. When it is used in an amount less than 0.01 part by weight, termination of the reaction may be difficult and gelation may occur. On the contrary, if it is used in excess of 2 parts by weight, the unreacted polymerization terminator may give off offensive odor. Also, the polymerization terminator is harmful to the human body. Hence, the aforesaid range may be preferred.

With the afore-described composition and contents, the copolymer of the present invention is prepared as follows. The functional styrene-butadiene copolymer is prepared by radical emulsion polymerizing the styrene monomer, the butadiene monomer and the reactive emulsifier at 0-80° C. for 1-48 hours, and has a weight average molecular weight of 100,000-3,000,000 g/mol. As described earlier, the molecular weight of the styrene-butadiene copolymer may be controlled by controlling the amount of the molecular weight control agent. When superior elasticity and mechanical properties are desired, a styrene-butadiene copolymer with a large molecular weight may be prepared. And, when improved processability is desired, a styrene-butadiene copolymer with a small molecular weight may be prepared. When the reaction temperature is below 0° C., reactivity of the emulsion polymerization may be unsatisfactory. On the contrary, if it exceeds 80° C., physical properties of the resulting polymer may be unsatisfactory.

Thus prepared functional styrene-butadiene copolymer has a structure represented by Chemical Formula 4, 5 or 6:

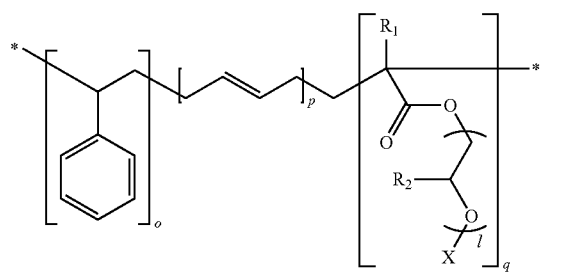

(4)

-continued

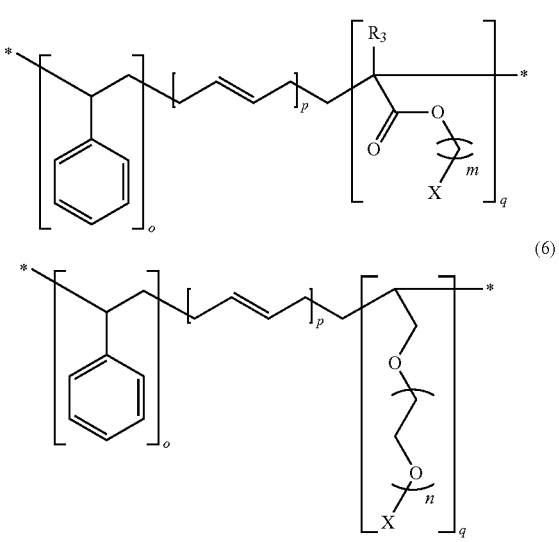

In Chemical Formulas 4 to 6, each of $R_1$, $R_2$ and $R_3$ is independently hydrogen or a $C_1$-$C_6$ alkyl group, l is an integer from 1 to 20, m is an integer from 1 to 20, n is an integer from 1 to 20, X is an amino group, an ammonium group, a hydroxyl group, a sulfonate group, a carboxylate group or a phosphate group, o is from 0.1 to 0.5, p is from 0.40 to 0.85, q is from 0.01 to 0.10, and o+p+q=1.

Thus prepared functional styrene-butadiene copolymer may have a nano-scale size of 20-200 nm. When the size is smaller than 20 run, the molecular weight may be too small. On the contrary, if it exceeds 200 nm, gelation and coagulation may occur. Hence, the aforesaid range may be preferred. The resultant styrene-butadiene copolymer may have a weight average molecular weight from 100,000-3,000,000 g/mol. When the weight average molecular weight is smaller than 100,000 g/mol, physical properties may be unsatisfactory. On the contrary, if it exceeds 3,000,000 g/mol, gelation may occur and processing may be difficult due to increased hardness.

A silica composite prepared by mixing the styrene-butadiene copolymer with silica has superior tensile property, abrasion resistance and wet traction (tan δ at 0° C.), and thus is very suitable to be sued as an industrial material for tires, belts, hoses, etc.

When preparing the silica composite, the silica may be added in an amount of 30-100 parts by weight based on 100 parts of the functional styrene-butadiene copolymer of the present invention by weight. When the silica is used in an amount less than 30 parts by weight, mechanical properties may be unsatisfactory due to low silica content. On the contrary, if the silica content exceeds 100 parts by weight, processing may be difficult because of increased Mooney viscosity. Hence, the aforesaid range may be preferred.

EXAMPLES

The examples and experiments will now be described. The following examples and experiments are for illustrative purposes only and not intended to limit the scope of this disclosure.

Example 1

Water (1600 mL), potassium rosinate (11 g), fatty acid potassium salt (18 g), potassium chloride (1.5 g), styrene (260 g), methylcarboxylate methacrylate (30 g), 1,3-butadiene (710 g), ethylenediaminetetraacetic acid (EDTA, 0.5 g), sodium hydrosulfite (0.3 g), ferrous sulfate (0.1 g), sodium formaldehyde sulfonate (0.4 g), n-dodecyl mercaptan (1.0 g) and methane hydroperoxide (0.6 g) were added to a 5-L pressurized reactor and polymerization was carried out by stirring for 8 hours at 10° C. Then, diethylhydroxyamine (1.0 g) was added to terminate the reaction.

After stripping and drying, a styrene-butadiene-methylcarboxylate methacrylate copolymer having a weight average molecular weight of 860,000 g/mol was prepared (FIG. 1).

Example 2

Water (1600 mL), potassium rosinate (11 g), fatty acid potassium salt (18 g), potassium chloride (1.5 g), styrene (280 g), polyoxyethylene phosphate methacrylate (10 g), 1,3-butadiene (710 g), EDTA (0.5 g), sodium hydrosulfite (0.3 g), ferrous sulfate (0.1 g), sodium formaldehyde sulfonate (0.4 g), n-dodecyl mercaptan (1.0 g) and methane hydroperoxide (0.6 g) were added to a 5-L pressurized reactor and polymerization was carried out by stirring for 8 hours at 10° C. Then, diethylhydroxyamine (1.0 g) was added to terminate the reaction.

Figure 2:
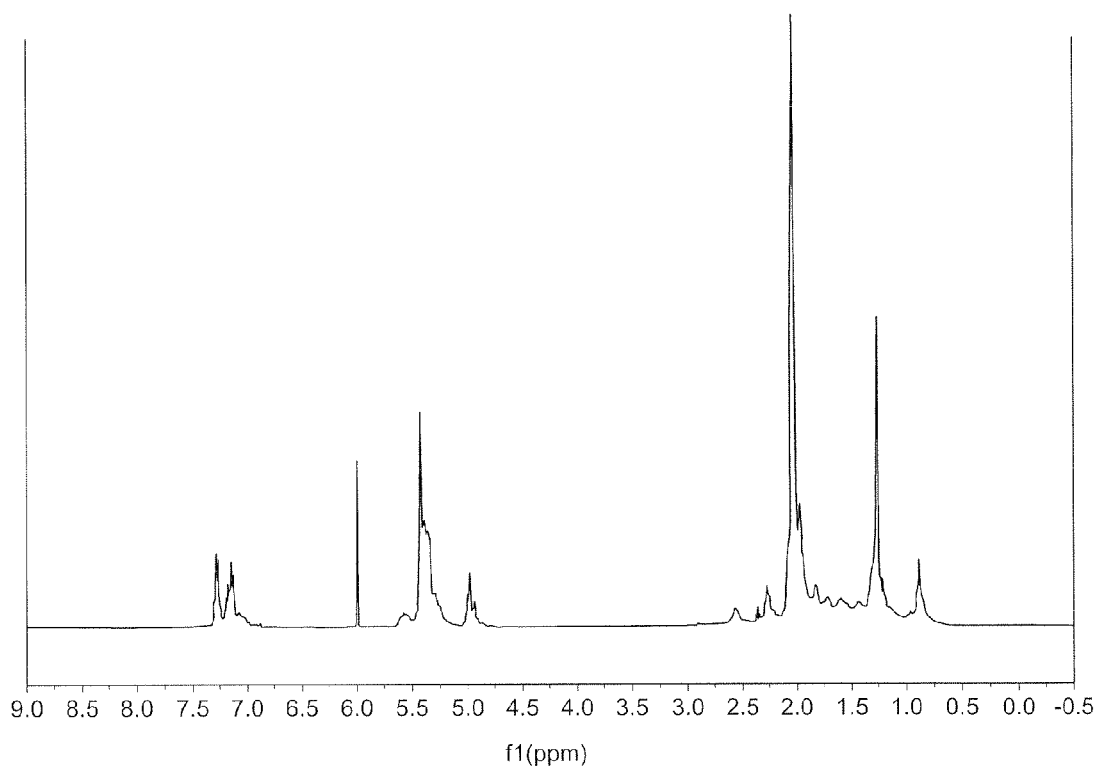
FIG. 2 shows an NMR spectrum of a styrene-butadiene-polyoxyethylene phosphate methacrylate copolymer prepared in Example 2.

After stripping and drying, a styrene-butadiene-polyoxyethylene phosphate methacrylate copolymer having a weight average molecular weight of 820,000 g/mol was prepared (FIG. 2).

Example 3

Water (1600 mL), potassium rosinate (11 g), fatty acid potassium salt (18 g), potassium chloride (1.5 g), styrene (260 g), polyoxyethylene phosphate methacrylate (30 g), 1,3-butadiene (710 g), EDTA (0.5 g), sodium hydrosulfite (0.3 g), ferrous sulfate (0.1 g), sodium formaldehyde sulfonate (0.4 g), n-dodecyl mercaptan (1.0 g) and methane hydroperoxide (0.6 g) were added to a 5-L pressurized reactor and polymerization was carried out by stirring for 8 hours at 10° C. Then, diethylhydroxyamine (1.0 g) was added to terminate the reaction.

Figure 3:
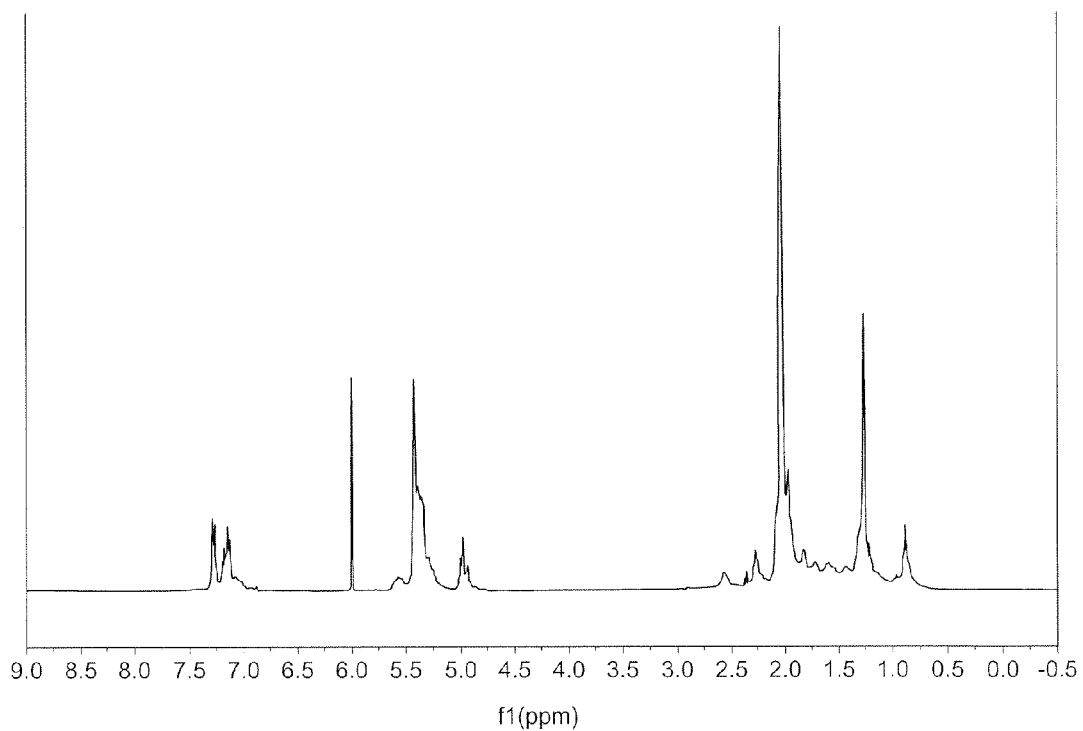
FIG. 3 shows an NMR spectrum of a styrene-butadiene-polyoxyethylene phosphate methacrylate copolymer prepared in Example 3.

After stripping and drying, a styrene-butadiene-polyoxyethylene phosphate methacrylate copolymer having a weight average molecular weight of 824,000 g/mol was prepared (FIG. 3).

Example 4

Water (1600 mL), potassium rosinate (11 g), fatty acid potassium salt (18 g), potassium chloride (1.5 g), styrene (260 g), allyl alcohol ethoxylate (30 g), 1,3-butadiene (710 g), EDTA (0.5 g), sodium hydrosulfite (0.3 g), ferrous sulfate (0.1 g), sodium formaldehyde sulfonate (0.4 g), n-dodecyl mercaptan (1.0 g) and methane hydroperoxide (0.6 g) were added to a 5-L pressurized reactor and polymerization was carried out by stirring for 8 hours at 10° C. Then, diethylhydroxyamine (1.0 g) was added to terminate the reaction.

Figure 4:
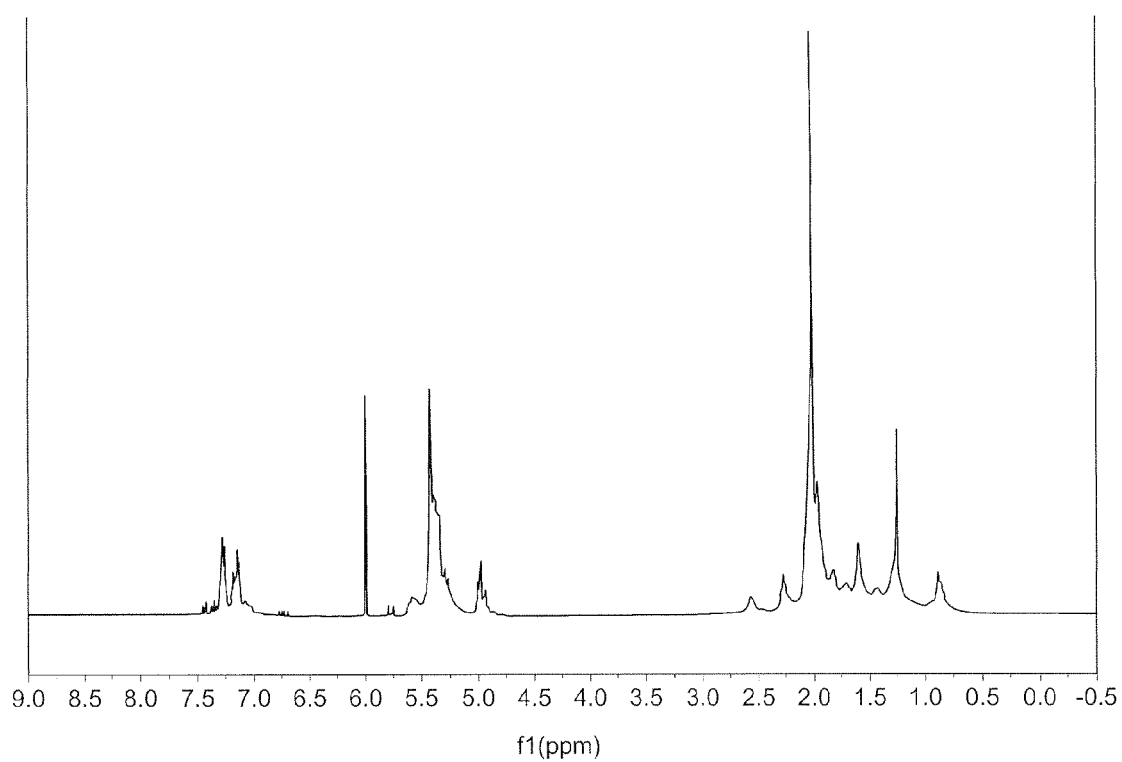
FIG. 4 shows an NMR spectrum of a styrene-butadiene-methyl alcohol ethoxylate copolymer prepared in Example 4.

After stripping and drying, a styrene-butadiene-methyl alcohol ethoxylate copolymer having a weight average molecular weight of 850,000 g/mol was prepared (FIG. 4).

Example 5

Water (1600 mL), potassium rosinate (11 g), fatty acid potassium salt (18 g), potassium chloride (1.5 g), styrene (260 g), ally! alcohol polyethylene oxide phosphate (30 g), 1,3-butadiene (710 g), EDTA (0.5 g), sodium hydrosulfite (0.3 g), ferrous sulfate (0.1 g), sodium formaldehyde sulfonate (0.4 g), n-dodecyl mercaptan (1.0 g) and methane hydroperoxide (0.6 g) were added to a 5-L pressurized reactor and polymerization was carried out by stirring for 8 hours at 10° C. Then, diethylhydroxyamine (1.0 g) was added to terminate the reaction.

Figure 5:
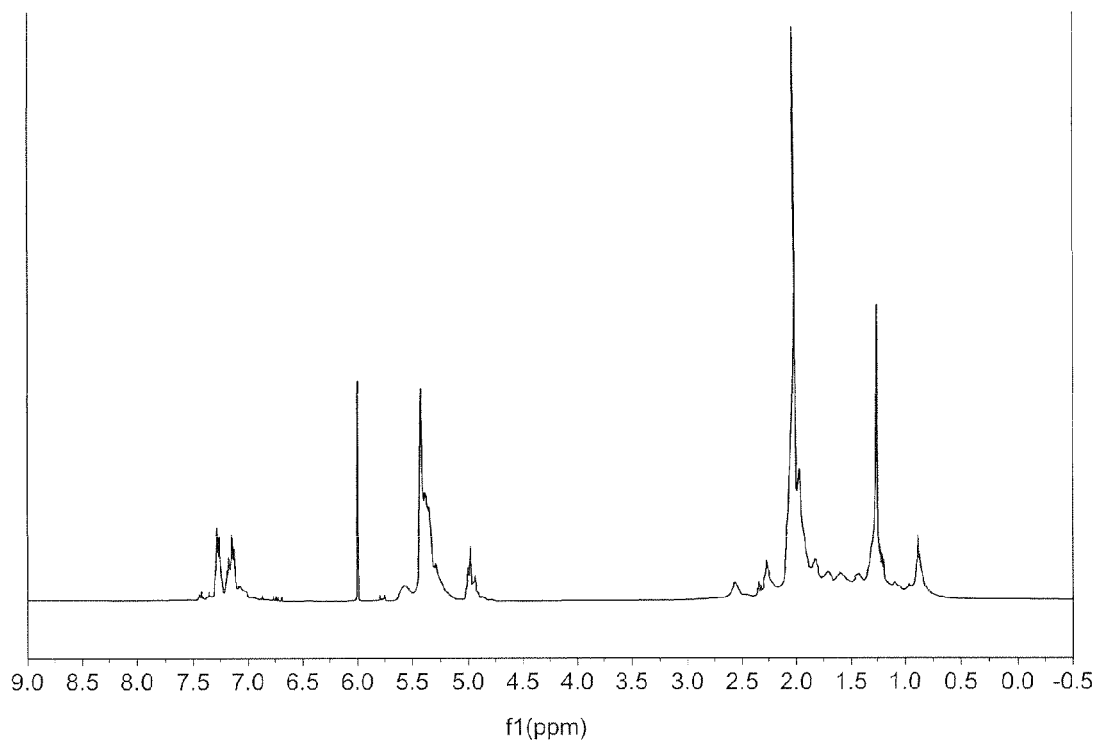
FIG. 5 shows an NMR spectrum of a styrene-butadiene-methyl alcohol polyethylene oxide phosphate copolymer prepared in Example 5.

After stripping and drying, a styrene-butadiene-methyl alcohol polyethylene oxide phosphate copolymer having a weight average molecular weight of 900,000 g/mol was prepared (FIG. 5).

Example 6

Water (1600 mL), potassium rosinate (11 g), fatty acid potassium salt (18 g), potassium chloride (1.5 g), styrene (260 g), allyl polyoxyethylene glycol methacrylate (30 g), 1,3-butadiene (710 g), EDTA (0.5 g), sodium hydrosulfite (0.3 g), ferrous sulfate (0.1 g), sodium formaldehyde sulfonate (0.4 g), n-dodecyl mercaptan (1.0 g) and methane hydroperoxide (0.6 g) were added to a 5-L pressurized reactor and polymerization was carried out by stirring for 8 hours at 10° C. Then, diethylhydroxyamine (1.0 g) was added to terminate the reaction.

Figure 6:
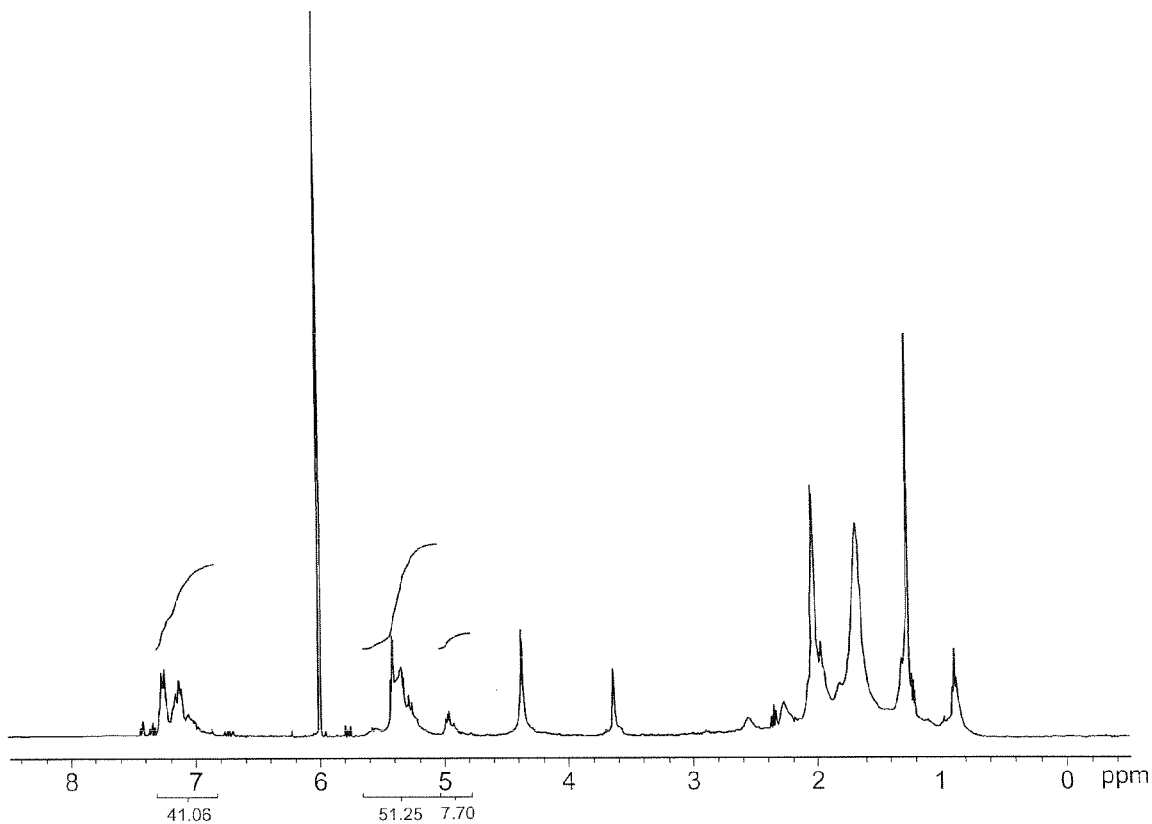
FIG. 6 shows an NMR spectrum of a styrene-butadiene-polyoxyethylene glycol methacrylate copolymer prepared in Example 6.

After stripping and drying, a styrene-butadiene-polyoxyethylene glycol methacrylate copolymer having a weight average molecular weight of 950,000 g/mol was prepared (FIG. 6).

Example 7

Water (1600 mL), potassium rosinate (11 g), fatty acid potassium salt (18 g), potassium chloride (1.5 g), styrene (260 g), polyoxypropylene glycol phosphate acrylate (30 g), 1,3-butadiene (710 g), EDTA (0.5 g), sodium hydrosulfite (0.3 g), ferrous sulfate (0.1 g), sodium formaldehyde sulfonate (0.4 g), n-dodecyl mercaptan (1.0 g) and methane hydroperoxide (0.6 g) were added to a 5-L pressurized reactor and polymerization was carried out by stirring for 8 hours at 10° C. Then, diethylhydroxyamine (1.0 g) was added to terminate the reaction.

Figure 7:
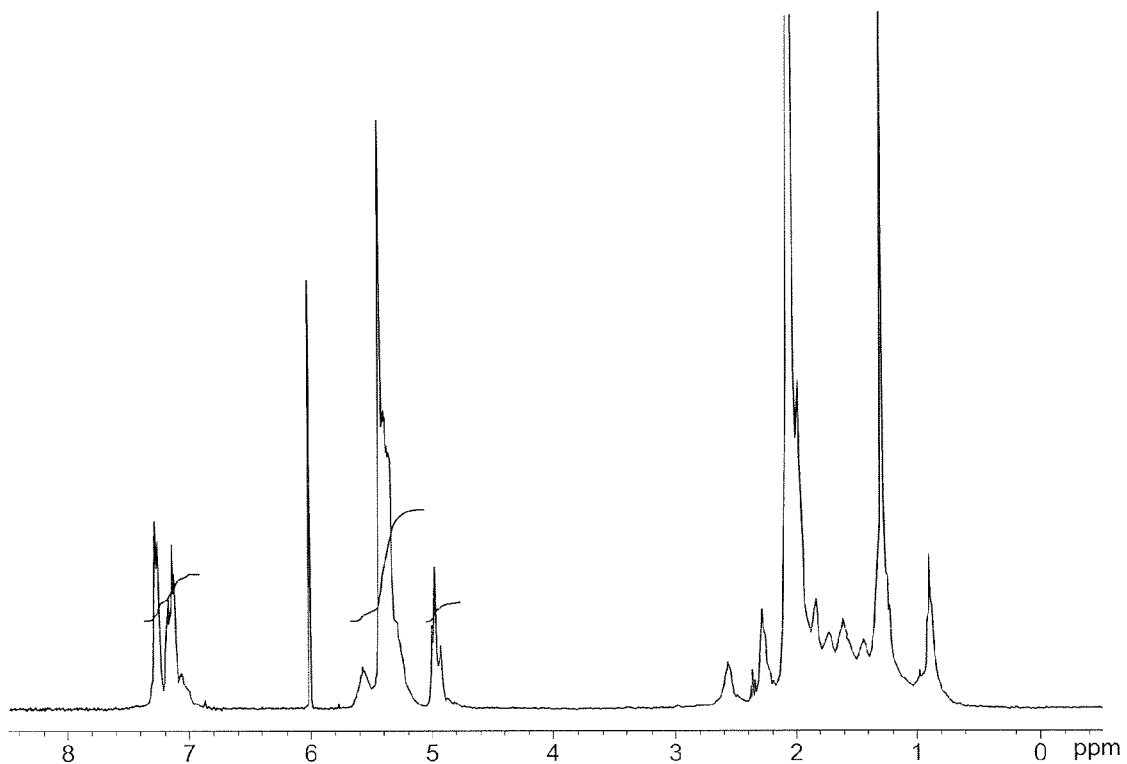
FIG. 7 shows an NMR spectrum of a styrene-butadiene-polyoxypropylene glycol phosphate acrylate copolymer prepared in Example 7.

After stripping and drying, a styrene-butadiene-polyoxypropylene glycol phosphate acrylate copolymer having a weight average molecular weight of 845,000 g/mol was prepared (FIG. 7).

Comparative Example 1

Water (1600 mL), potassium rosinate (22 g), fatty acid potassium salt (36 g), potassium chloride (1.5 g), styrene (290 g), 1,3-butadiene (710 g), EDTA (0.5 g), sodium hydrosulfite (0.3 g), ferrous sulfate (0.1 g), sodium formaldehyde sulfonate (0.4 g), n-dodecyl mercaptan (1.0 g) and methane hydroperoxide (0.6 g) were added to a 5-L pressurized reactor and polymerization was carried out by stirring for 8 hours at 10° C. Then, diethylhydroxyamine (1.0 g) was added to terminate the reaction.

Figure 8:
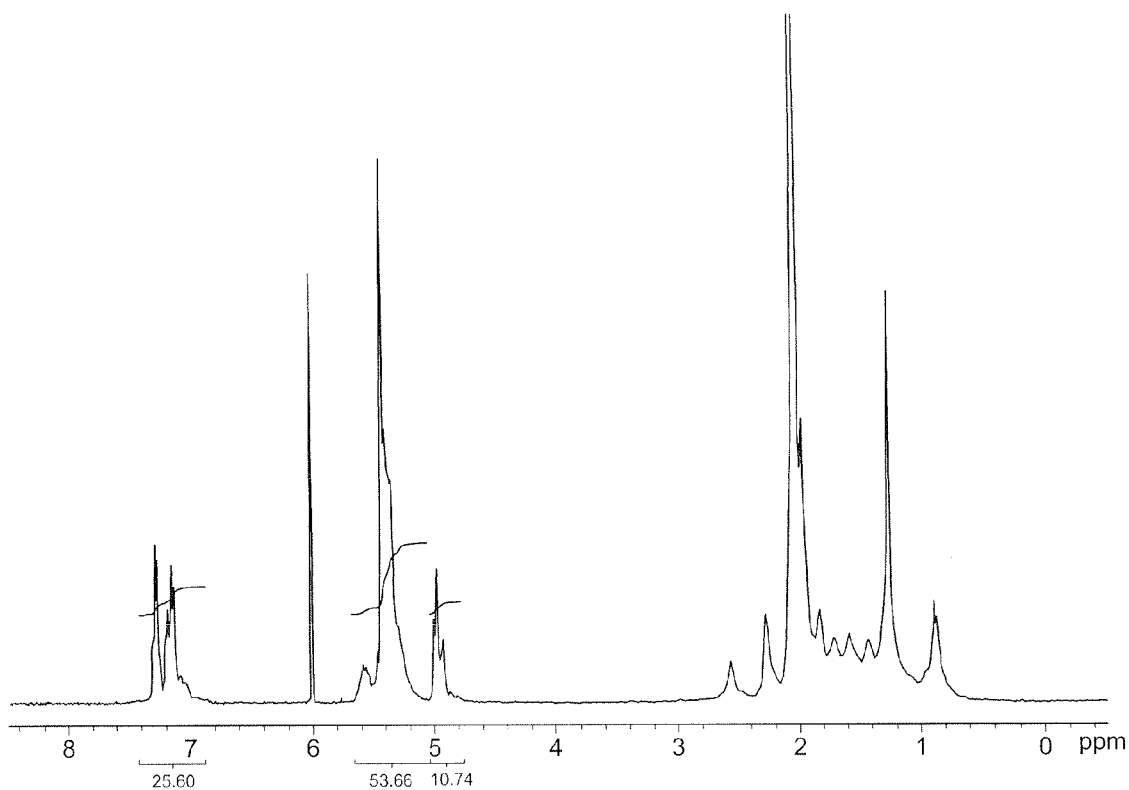
FIG. 8 shows an NMR spectrum of a styrene-butadiene copolymer prepared in Comparative Example 1.

After stripping and drying, a styrene-butadiene copolymer having a weight average molecular weight of 920,000 g/mol was prepared (FIG. 8).

Comparative Example 2

Water (1600 mL), potassium rosinate (22 g), fatty acid potassium salt (36 g), potassium chloride (25 g), styrene (260 g), methyl methacrylate (30 g), 1,3-butadiene (710 g), EDTA (0.5 g), sodium hydrosulfite (0.5 g), ferrous sulfate (0.1 g), sodium formaldehyde sulfonate (0.5 g), n-dodecyl mercaptan (1.5 g) and methane hydroperoxide (0.6 g) were added to a 5-L pressurized reactor and polymerization was carried out by stirring for 8 hours at 10° C. Then, diethylhydroxyamine (1.0 g) was added to terminate the reaction.

Figure 9:
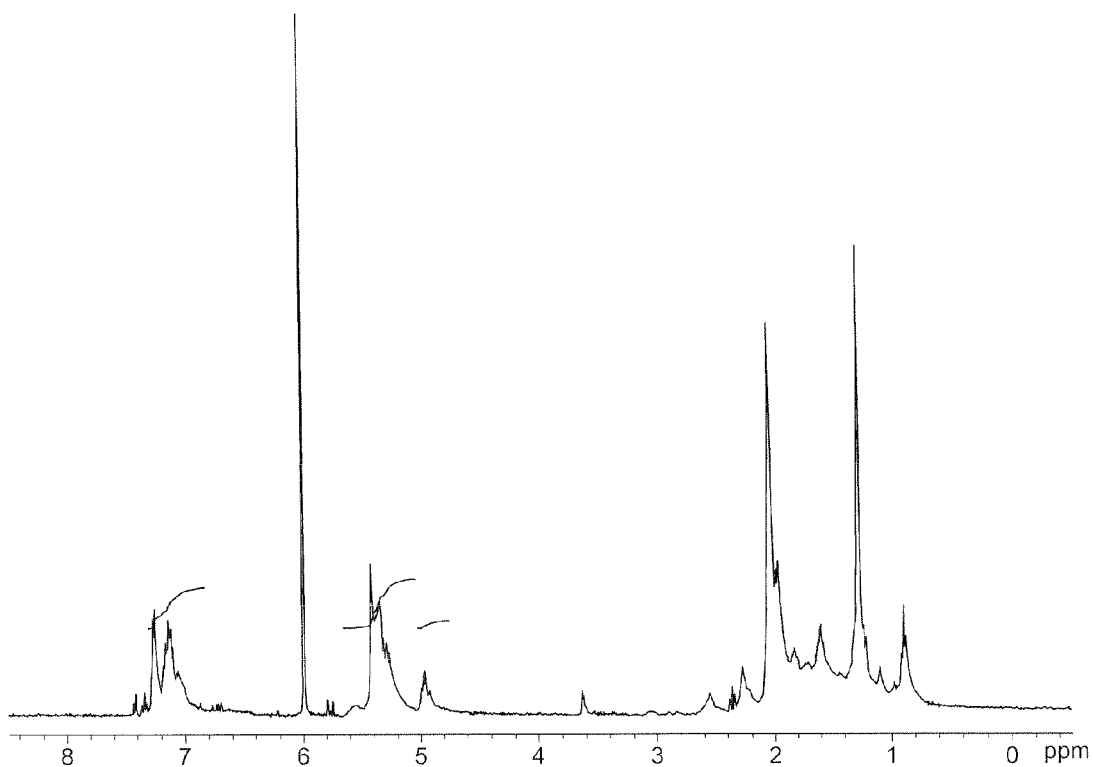
FIG. 9 shows an NMR spectrum of a styrene-butadiene-methyl methacrylate copolymer prepared in Comparative Example 2.

After stripping and drying, a styrene-butadiene-methyl methacrylate copolymer having a weight average molecular weight of 900,000 g/mol was prepared (FIG. 9).

Comparative Example 3

Water (1600 mL), potassium rosinate (22 g), fatty acid potassium salt (36 g), potassium chloride (25 g), styrene (260 g), 2-hydroxypropyl methacrylate (30 g), 1,3-butadiene (710 g), EDTA (0.5 g), sodium hydrosulfite (0.5 g), ferrous sulfate (0.1 g), sodium formaldehyde sulfonate (0.5 g), n-dodecyl mercaptan (1.5 g) and methane hydroperoxide (0.6 g) were added to a 5-L pressurized reactor and polymerization was carried out by stirring for 8 hours at 10° C. Then, diethylhydroxyamine (1.0 g) was added to terminate the reaction.

Figure 10:
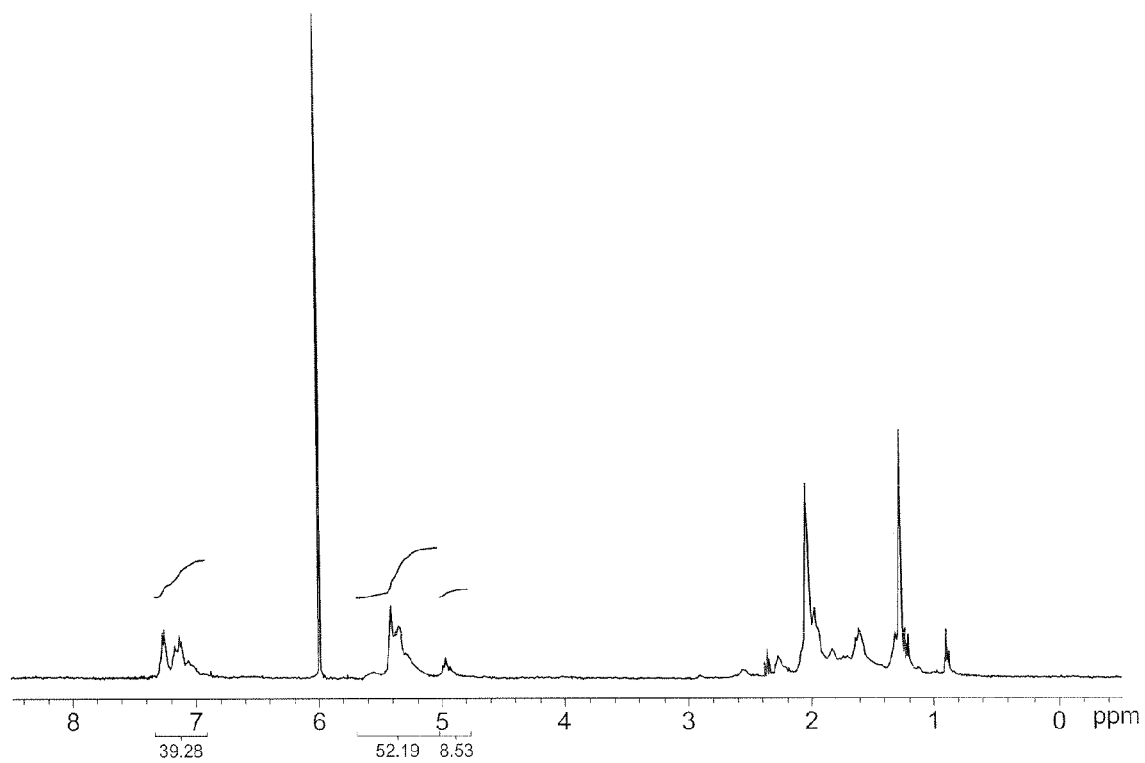
FIG. 10 shows an NMR spectrum of a styrene-butadiene-2-hydroxypropyl methacrylate copolymer prepared in Comparative Example 3.

After stripping and drying, a styrene-butadiene-2-hydroxypropyl methacrylate copolymer having a weight average molecular weight of 850,000 g/mol was prepared (FIG. 10).

The composition and contents of the polymers prepared in Examples 1-7 and Comparative Examples 1-3 are summarized in Tables 1 and 2.

TABLE 1

| | Reactants | Ex. 1 | Ex. 2 | Ex. 3 | Ex. 4 | Ex. 5 | Ex. 6 | Ex. 7 |
|---|---|---|---|---|---|---|---|---|
| Styrene monomer | Styrene (g) | 260 | 280 | 260 | 260 | 260 | 260 | 260 |
| Butadiene monomer | 1,3-Butadiene (g) | 710 | 710 | 710 | 710 | 710 | 710 | 710 |
| Reactive emulsifier | Methylcarboxylate methacrylate (g) | 30 | | | | | | |
| | Polyoxyethylene phosphate methacrylate (g) | | 10 | 30 | | | | |
| | Allyl alcohol ethoxylate (g) | | | | 30 | | | |
| | Allyl alcohol polyethylene oxide phosphate (g) | | | | | 30 | | |
| | Polyoxyethylene glycol methacrylate (g) | | | | | | 30 | |
| | Polyoxypropylene glycol phosphate acrylate (g) | | | | | | | 30 |
| | Total (g) | 1000 | 1000 | 1000 | 1000 | 1000 | 1000 | 1000 |
| Molecular weight control agent | n-Dodecyl mercaptan (g) | 1.5 | 1.5 | 1.5 | 1.5 | 1.5 | 1.5 | 1.5 |
| Emulsifier | Potassium rosinate (g) | 11 | 11 | 11 | 11 | 11 | 11 | 11 |
| | Fatty acid potassium salt (g) | 18 | 18 | 18 | 18 | 18 | 18 | 18 |

TABLE 1-continued

| | Reactants | Ex. 1 | Ex. 2 | Ex. 3 | Ex. 4 | Ex. 5 | Ex. 6 | Ex. 7 |
|---|---|---|---|---|---|---|---|---|
| Radical initiator | Methane hydroperoxide (g) | 0.6 | 0.6 | 0.6 | 0.6 | 0.6 | 0.6 | 0.6 |
| | EDTA/ferrous sulfate (g/g) | 0.5/0.1 | 0.5/0.1 | 0.5/0.1 | 0.5/0.1 | 0.5/0.1 | 0.5/0.1 | 0.5/0.1 |
| Polymerization terminator | Diethylhydroxyamine (g) | 1.0 | 1.0 | 1.0 | 1.0 | 1.0 | 1.0 | 1.0 |
| Weight average molecular weight (g/mol) | | 860,000 | 820,000 | 824,000 | 850,000 | 900,000 | 950,000 | 845,000 |

TABLE 2

| | | Comp. Ex. 1 | Comp. Ex. 2 | Comp. Ex. 3 |
|---|---|---|---|---|
| Reactants | Styrene monomer    Styrene (g) | 290 | 260 | 260 |
| | Butadiene monomer  1,3-Butadiene (g) | 710 | 710 | 710 |
| | Methyl methacrylate (g) | 0 | 30 | |
| | 2-Hydroxypropyl methacrylate (g) | | | 30 |
| | Total (g) | 1000 | 1000 | 1000 |
| Molecular weight control agent | n-Dodecyl mercaptan (g) | 1.5 | 1.5 | 1.5 |
| Emulsifier | Potassium rosinate (g) | 22 | 22 | 22 |
| | Fatty acid potassium salt (g) | 36 | 36 | 36 |
| Radical initiator | Methane hydroperoxide (g) | 0.6 | 0.6 | 0.6 |
| | EDTA/ferrous sulfate (g/g) | 0.5/0.1 | 0.5/0.1 | 0.5/0.1 |
| Polymerization terminator | Diethylhydroxyamine (g) | 1.0 | 1.0 | 1.0 |
| Weight average molecular weight (g/mol) | | 920,000 | 900,000 | 850,000 |

Preparation Example 1

Preparation of Tire Tread Sheet

The styrene-butadiene-methylcarboxylate methacrylate copolymer of Example 1 (100 g), a process oil (37.5 g), zinc oxide (3 g), stearic acid (2 g), silica (Zeosil 175, 70 g), bis(3-(triethoxysilyl)propyl)tetrasulfide (Si69, 5.6 g) and an antioxidant (6-PPD, 1 g) were sequentially added to an internal mixer (Banbury mixer). After mixing at 130° C. and at 60 rpm for 6.5 minutes, the processing temperature was cooled to 50° C. Then, sulfur (2 g) and a vulcanization accelerator (N-cyclohexyl-2-benzothiazylsulfenamide, 3 g) were mixed with the resulting mixture by stirring for 3 minutes at 60° C. and at 50 rpm. Then, after shaping into a flat sheet on a 2-mm thick roll, the resulting sheet was allowed to stand for 24 hours. After vulcanization on a hot press at 160° C. by applying a pressure of 160 kgf/cm² or greater for 10 minutes, a test specimen in the form of a 2-mm thick sheet was prepared.

Preparation Example 2

Preparation of Tire Tread Sheet

The styrene-butadiene-polyoxyethylene phosphate methacrylate copolymer of Example 2 (100 g), a process oil (37.5 g), zinc oxide (3 g), stearic acid (2 g), Zeosil 175 (70 g), Si69 (5.6 g) and 6-PPD (1 g) were sequentially added to an internal mixer (Banbury mixer). After mixing at 130° C. and at 60 rpm for 6.5 minutes, the processing temperature was cooled to 50° C. Then, sulfur (2 g) and N-cyclohexyl-2-benzothiazylsulfenamide (3 g) were mixed with the resulting mixture by stirring for 3 minutes at 60° C. and at 50 rpm. Then, after shaping into a flat sheet on a 2-mm thick roll, the resulting sheet was allowed to stand for 24 hours. After vulcanization on a hot press at 160° C. by applying a pressure of 160 kgf/cm² or greater for 10 minutes, a test specimen in the form of a 2-mm thick sheet was prepared.

Preparation Example 3

Preparation of Tire Tread Sheet

The styrene-butadiene-polyoxyethylene phosphate methacrylate copolymer of Example 3 (100 g), a process oil (37.5 g), zinc oxide (3 g), stearic acid (2 g), Zeosil 175 (70 g), Si69 (5.6 g) and 6-PPD (1 g) were sequentially added to an internal mixer (Banbury mixer). After mixing at 130° C. and at 60 rpm for 6.5 minutes, the processing temperature was cooled to 50° C. Then, sulfur (2 g) and N-cyclohexyl-2-benzothiazylsulfenamide (3 g) were mixed with the resulting mixture by stirring for 3 minutes at 60° C. and at 50 rpm. Then, after shaping into a flat sheet on a 2-mm thick roll, the resulting sheet was allowed to stand for 24 hours. After vulcanization on a hot press at 160° C. by applying a pressure of 160 kgf/cm² or greater for 10 minutes, a test specimen in the form of a 2-mm thick sheet was prepared.

Preparation Example 4

Preparation of Tire Tread Sheet

The styrene-butadiene-allyl alcohol ethoxylate copolymer of Example 4 (100 g), a process oil (37.5 g), zinc oxide (3 g), stearic acid (2 g), Zeosil 175 (70 g), Si69 (5.6 g) and 6-PPD (1 g) were sequentially added to an internal mixer (Banbury mixer). After mixing at 130° C. and at 60 rpm for 6.5 minutes, the processing temperature was cooled to 50° C. Then, sulfur (2 g) and N-cyclohexyl-2-benzothiazylsulfenamide (3 g) were mixed with the resulting mixture by stirring for 3 minutes at 60° C. and at 50 rpm. Then, after shaping into a flat sheet on a 2-mm thick roll, the resulting sheet was allowed to stand for 24 hours. After vulcanization on a hot press at 160° C. by applying a pressure of 160 kgf/cm² or greater for 10 minutes, a test specimen in the form of a 2-mm thick sheet was prepared.

Preparation Example 5

Preparation of Tire Tread Sheet

The styrene-butadiene-allyl alcohol polyethylene oxide phosphate copolymer of Example 5 (100 g), a process oil (37.5 g), zinc oxide (3 g), stearic acid (2 g), Zeosil 175 (70 g), Si69 (5.6 g) and 6-PPD (1 g) were sequentially added to an internal mixer (Banbury mixer). After mixing at 130° C. and at 60 rpm for 6.5 minutes, the processing temperature was cooled to 50° C. Then, sulfur (2 g) and N-cyclohexyl-2-benzothiazylsulfenamide (3 g) were mixed with the resulting mixture by stirring for 3 minutes at 60° C. and at 50 rpm. Then, after shaping into a flat sheet on a 2-mm thick roll, the resulting sheet was allowed to stand for 24 hours. After vulcanization on a hot press at 160° C. by applying a pressure of 160 kgf/cm² or greater for 10 minutes, a test specimen in the form of a 2-mm thick sheet was prepared.

Preparation Example 6

Preparation of Tire Tread Sheet

The styrene-butadiene-polyoxyethylene glycol methacrylate copolymer of Example 6 (100 g), a process oil (37.5 g), zinc oxide (3 g), stearic acid (2 g), Zeosil 175 (70 g), Si69 (5.6 g) and 6-PPD (1 g) were sequentially added to an internal mixer (Banbury mixer). After mixing at 130° C. and at 60 rpm for 6.5 minutes, the processing temperature was cooled to 50° C. Then, sulfur (2 g) and N-cyclohexyl-2-benzothiazylsulfenamide (3 g) were mixed with the resulting mixture by stirring for 3 minutes at 60° C. and at 50 rpm. Then, after shaping into a flat sheet on a 2-mm thick roll, the resulting sheet was allowed to stand for 24 hours. After vulcanization on a hot press at 160° C. by applying a pressure of 160 kgf/cm² or greater for 10 minutes, a test specimen in the form of a 2-mm thick sheet was prepared.

Preparation Example 7

Preparation of Tire Tread Sheet

The styrene-butadiene-polyoxypropylene glycol phosphate acrylate copolymer of Example 7 (100 g), a process oil (37.5 g), zinc oxide (3 g), stearic acid (2 g), Zeosil 175 (70 g), Si69 (5.6 g) and 6-PPD (1 g) were sequentially added to an internal mixer (Banbury mixer). After mixing at 130° C. and at 60 rpm for 6.5 minutes, the processing temperature was cooled to 50° C. Then, sulfur (2 g) and N-cyclohexyl-2-benzothiazylsulfenamide (3 g) were mixed with the resulting mixture by stirring for 3 minutes at 60° C. and at 50 rpm. Then, after shaping into a flat sheet on a 2-mm thick roll, the resulting sheet was allowed to stand for 24 hours. After vulcanization on a hot press at 160° C. by applying a pressure of 160 kgf/cm² or greater for 10 minutes, a test specimen in the form of a 2-mm thick sheet was prepared.

Comparative Preparation Example 1

Preparation of Tire Tread Sheet

The styrene-butadiene copolymer of Comparative Example 1 (100 g), a process oil (37.5 g), zinc oxide (3 g), stearic acid (2 g), Zeosil 175 (70 g), Si69 (5.6 g) and an antioxidant (1 g) were sequentially added to an internal mixer (Banbury mixer). After mixing at 130° C. and at 60 rpm for 6.5 minutes, the processing temperature was cooled to 50° C. Then, sulfur (2 g) and N-cyclohexyl-2-benzothiazylsulfenamide (3 g) were mixed with the resulting mixture by stirring for 3 minutes at 60° C. and at 50 rpm. Then, after shaping into a flat sheet on a 2-mm thick roll, the resulting sheet was allowed to stand for 24 hours. After vulcanization on a hot press at 160° C. by applying a pressure of 160 kgf/cm² or greater for 10 minutes, a test specimen in the form of a 2-mm thick sheet was prepared.

Comparative Preparation Example 2

Preparation of Tire Tread Sheet

The styrene-butadiene-methyl methacrylate copolymer of Comparative Example 2 (100 g), a process oil (37.5 g), zinc oxide (3 g), stearic acid (2 g), Zeosil 175 (70 g), Si69 (5.6 g) and an antioxidant (1 g) were sequentially added to an internal mixer (Banbury mixer). After mixing at 130° C. and at 60 rpm for 6.5 minutes, the processing temperature was cooled to 50° C. Then, sulfur (2 g) and N-cyclohexyl-2-benzothiazylsulfenamide (3 g) were mixed with the resulting mixture by stirring for 3 minutes at 60° C. and at 50 rpm. Then, after shaping into a flat sheet on a 2-mm thick roll, the resulting sheet was allowed to stand for 24 hours. After vulcanization on a hot press at 160° C. by applying a pressure of 160 kgf/cm² or greater for 10 minutes, a test specimen in the form of a 2-mm thick sheet was prepared.

Comparative Preparation Example 3

Preparation of Tire Tread Sheet

The styrene-butadiene-2-hydroxypropyl methacrylate copolymer of Comparative Example 3 (100 g), a process oil (37.5 g), zinc oxide (3 g), stearic acid (2 g), Zeosil 175 (70 g), Si69 (5.6 g) and an antioxidant (1 g) were sequentially added to an internal mixer (Banbury mixer). After mixing at 130° C. and at 60 rpm for 6.5 minutes, the processing temperature was cooled to 50° C. Then, sulfur (2 g) and N-cyclohexyl-2-benzothiazylsulfenamide (3 g) were mixed with the resulting mixture by stirring for 3 minutes at 60° C. and at 50 rpm. Then, after shaping into a flat sheet on a 2-mm thick roll, the resulting sheet was allowed to stand for 24 hours. After vulcanization on a hot press at 160° C. by applying a pressure of 160 kgf/cm² or greater for 10 minutes, a test specimen in the form of a 2-mm thick sheet was prepared.

[Measurement of Physical Properties]

Physical properties of the test specimens prepared in Preparation Examples 1-7 and Comparative Preparation Examples 1-3 were measured. The result is given in Tables 3-5. Processability was evaluated by comparing the compound Mooney viscosity. Tensile properties were measured according to ASTM D412. Abrasion property was measured according to the DIN method. And, wet traction was measured according to the hysteresis (tan δ) method. In general, the traction property can be predicted from the tan δ value at 0° C. It is known that a higher tan δ value indicates a better traction. The rolling resistance can be predicted from the tan δ value at 60° C. It is known that a lower tan δ value is translated into better rolling resistance.

TABLE 3

| | | Prep. Ex. 1 | Prep. Ex. 2 | Prep. Ex. 3 | Prep. Ex. 4 |
|---|---|---|---|---|---|
| Components (g) | Styrene-butadiene-methylcarboxylate methacrylate copolymer | 70 | | | |
| | Styrene-butadiene-polyoxyethylene phosphate methacrylate copolymer | | 70 | 70 | |
| | Styrene-butadiene-allyl alcohol ethoxylate copolymer | | | | 70 |
| | BR | 30 | 30 | 30 | 30 |
| | Oil | 37.5 | 37.5 | 37.5 | 37.5 |
| | Silica | 70 | 70 | 70 | 70 |
| | Si69 | 5.6 | 5.6 | 5.6 | 5.6 |
| | ZnO | 3 | 3 | 3 | 3 |
| | S/A | 2 | 2 | 2 | 2 |
| | Sulfur | 2 | 2 | 2 | 2 |
| | Vulcanization accelerator | 3 | 3 | 3 | 3 |
| | 6-PPD | 1 | 1 | 1 | 1 |
| Processability | Compound Mooney viscosity ($ML_{1+4}$, 100° C.) | 69.5 | 68.7 | 73.1 | 70 |
| Tensile properties | Hardness (Shore A) | 70 | 66 | 70 | 70 |
| | Modulus 300% ($kgf/cm^2$) | 157 | 156 | 165 | 160 |
| | Tensile strength ($kgf/cm^2$) | 184 | 180 | 187 | 185 |
| | Elongation (%) | 330 | 335 | 310 | 330 |
| Dynamic properties | $T_g$ (° C.) | −38.9 | −39.2 | −38.5 | −38.1 |
| | Tan δ (0° C.) | 0.2005 | 0.2234 | 0.2578 | 0.1934 |
| | Tan δ (60° C.) | 0.079 | 0.0717 | 0.070 | 0.082 |
| Abrasion property (DIN) | Abrasion amount (g) | 0.0785 | 0.0755 | 0.0725 | 0.081 |

BR: Polybutadiene rubber (KBR-01, KKPC)
Si69: Bis(3-triethoxysilylpropyl)tetrasulfide
S/A: Stearic acid
6-PPD: N-(1,3-Dimethyl)-N'-phenyl-p-phenylenediamine
Vulcanization accelerator: N-Cyclohexyl-2-benzothiazylsulfenamide

TABLE 4

| | | Prep. Ex. 5 | Prep. Ex. 6 | Prep. Ex. 7 |
|---|---|---|---|---|
| Components (g) | Styrene-butadiene-allyl alcohol polyethylene oxide phosphate | 70 | | |
| | Styrene-butadiene-polyoxyethylene glycol methacrylate copolymer | | 70 | |
| | Styrene-butadiene-polyoxypropylene glycol phosphate acrylate copolymer | | | 70 |
| | BR | 30 | 30 | 30 |
| | Oil | 37.5 | 37.5 | 37.5 |
| | Silica | 70 | 70 | 70 |
| | Si69 | 5.6 | 5.6 | 5.6 |
| | ZnO | 3 | 3 | 3 |
| | S/A | 2 | 2 | 2 |
| | Sulfur | 2 | 2 | 2 |
| | Vulcanization accelerator | 3 | 3 | 3 |
| | 6-PPD | 1 | 1 | 1 |
| Processability | Compound Mooney viscosity ($ML_{1+4}$, 100° C.) | 71 | 81 | 67 |
| Tensile properties | Hardness (Shore A) | 70 | 75 | 65 |
| | Modulus 300% ($kgf/cm^2$) | 161 | 151 | 143 |
| | Tensile strength ($kgf/cm^2$) | 185 | 195 | 175 |
| | Elongation (%) | 325 | 300 | 340 |
| Dynamic properties | $T_g$ (° C.) | −36.6 | −36.5 | −40.2 |
| | Tan δ (0° C.) | 0.230 | 0.1995 | 0.234 |
| | Tan δ (60° C.) | 0.081 | 0.080 | 0.0705 |
| Abrasion property (DIN) | Abrasion amount (g) | 0.078 | 0.069 | 0.073 |

BR: Polybutadiene rubber (KBR-01, KKPC)
Si69: Bis(3-triethoxysilylpropyl)tetrasulfide
S/A: Stearic acid
6-PPD: N-(1,3-Dimethyl)-N'-phenyl-p-phenylenediamine
Vulcanization accelerator: N-Cyclohexyl-2-benzothiazylsulfenamide

TABLE 5

| | | Comp. Prep. Ex. 1 | Comp. Prep. Ex. 2 | Comp. Prep. Ex. 3 |
|---|---|---|---|---|
| Components (g) | Styrene-butadiene copolymer | 70 | | |
| | Styrene-butadiene-methyl methacrylate copolymer | | 70 | |
| | Styrene-butadiene-2-hydroxypropyl methacrylate copolymer | | | 70 |
| | BR | 30 | 30 | 30 |
| | Oil | 37.5 | 37.5 | 37.5 |
| | Silica | 70 | 70 | 70 |
| | Si69 | 5.6 | 5.6 | 5.6 |
| | ZnO | 3 | 3 | 3 |
| | S/A | 2 | 2 | 2 |
| | Sulfur | 2 | 2 | 2 |
| | Vulcanization accelerator | 3 | 3 | 3 |
| | 6-PPD | 1 | 1 | 1 |
| Processability | Compound Mooney viscosity ($ML_{1+4}$, 100° C.) | 66.5 | 87 | 87 |

TABLE 5-continued

|  |  | Comp. Prep. Ex. 1 | Comp. Prep. Ex. 2 | Comp. Prep. Ex. 3 |
|---|---|---|---|---|
| Tensile properties | Hardness (Shore A) | 65 | 68 | 68 |
|  | Modulus 300% (kgf/cm²) | 120 | 161 | 161 |
|  | Tensile strength (kgf/cm²) | 171 | 180 | 180 |
|  | Elongation (%) | 384 | 298 | 298 |
| Dynamic properties | $T_g$ (° C.) | −42.9 | −43.9 | −39.8 |
|  | Tan δ (0° C.) | 0.1838 | 0.1753 | 0.185 |
|  | Tan δ (60° C.) | 0.0969 | 0.1015 | 0.095 |
| Abrasion property (DIN) | Abrasion amount (g) | 0.098 | 0.094 | 0.092 |

Styrene-butadiene copolymer: ESBR 1712T, KKPC
BR: Polybutadiene rubber (KBR-01, KKPC)
Si69: Bis(3-triethoxysilylpropyl)tetrasulfide
S/A: Stearic acid
6-PPD: N-(1,3-Dimethyl)-N'-phenyl-p-phenylenediamine
Vulcanization accelerator: N-Cyclohexyl-2-benzothiazylsulfenamide As seen from Tables 3-5, Preparation Examples 1-7 exhibited better wet traction, rolling resistance and abrasion resistance as compared to Comparative Preparation Examples 1-3, due to improved silica affinity.

better processability, which results from improved silica affinity, better tensile properties, better abrasion resistance, better wet traction (tan δ at 0° C.) and better rolling resistance than Comparative Preparation Example (wherein the copolymers of Comparative Examples 1-3 were used).

The introduction of the reactive emulsifier represented by Chemical Formula 1, 2 or 3 results in improved silica affinity of the styrene-butadiene copolymer, thereby providing superior processability and tensile properties and remarkably improved dynamic properties. Therefore, when the styrene-butadiene copolymer according to the present invention is used as a tire tread material, the hysteresis can be reduced, the tire wet traction can be improved, and the abrasion resistance can be enhanced.

The present invention has been described in detail with reference to specific embodiments thereof. However, it will be appreciated by those skilled in the art that various changes and modifications may be made in these embodiments without departing from the principles and spirit of the disclosure, the scope of which is defined in the appended claims and their equivalents.

What is claimed is:

1. A method for preparing a styrene-butadiene copolymer by radical emulsion polymerizing a styrene monomer with a butadiene monomer using a reactive emulsifier represented by Chemical Formula 1, 2, or 3;

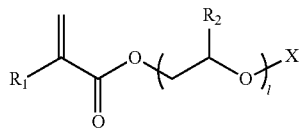

(1)

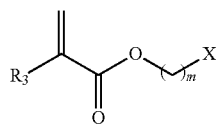

(2)

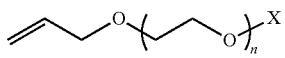

(3)

wherein each of $R_1$, $R_2$ and $R_3$ is independently hydrogen or a $C_1$-$C_6$ alkyl group, l is an integer from 1 to 20, m is an integer from 1 to 20, n is an integer from 1 to 20, and X is an ammo group, an ammonium group, a hydroxyl group, a sulfonate group, a carboxylate group or a phosphate group.

2. The method for preparing a styrene-butadiene copolymer according to claim 1,
   wherein the styrene monomer is one or more selected from styrene, α-methylstyrene, dimethylstyrene and halogenated styrene.

3. The method for preparing a styrene-butadiene copolymer according to claim 1,
   wherein the styrene monomer is used in an amount of 10-50 wt % based on the weight of the total reactants.

4. The method for preparing a styrene-butadiene copolymer according to claim 1,
   wherein the butadiene monomer is one or more selected from 1,3-butadiene, isoprene and halogenated butadiene.

5. The method for preparing a styrene-butadiene copolymer according to claim 1,
   wherein the butadiene monomer is used in an amount of 45-85 wt % based on the weight of the total reactants.

6. The method for preparing a styrene-butadiene copolymer according to claim 1,
   wherein the reactive emulsifier is polyoxyethylene phosphate methacrylate, polyoxyethylene carboxylate methacrylate polyoxyethylene sultanate methacrylate, polyoxyethylene hydroxymethacrylate, polyoxyethylene glycol methacrylate, polyoxypropylene phosphate methacrylate, polyoxypropylene carboxylate methacrylate, polyoxypropylene sultanate methacrylate, polyoxypropylene llydroxymethacrylate, polyoxypropylene glycol methacrylate, polyoxypropylene glycol phosphate acrylate, polyoxyethylene phosphate acrylate, polyoxyethylene carboxylate acrylate, polyoxyethylene sulfonate acrylate, polyoxyethylene hydroxyacrylate, polyoxyethylene glycol acrylate, polyoxypropylene phosphate acrylate, polyoxypropylene carboxylate acrylate, polyoxypropylerie sulfonate acrylate, polyoxyptopylene hydroxyacrylate, polyoxypropylene glycol acrylate, allyl alcohol ethoxylate, allyl alcohol polyethylene oxide phosphate, alkylcarboxylate acrylate, alkylcarboxylate methacrylate, alkyl phosphate acrylate, alkyl phosphate methacrylate, alkylsulfonate acrylate, alkylsulfonate methacrylate, alkylhydroxy acrylate, or alkylhydroxy methacrylate (wherein each alkyl is $C_1$-$C_6$ alkyl).

7. The method for preparing a styrene-butadiene copolymer according to claim 1,
   wherein the reactive emulsifier is used in an amount of 0.1-10 wt % based on the weight of the total reactants.

8. The method for preparing a styrene-butadiene copolymer according to claim 1,
   wherein, in the radical emulsion polymerization, one or more initiator(s) selected from potassium persulfate, ammoniam persulfate, acetylacetone peroxide, benzyl peroxide, dicumyl peroxide, methane hydroperoxide, 2,4-dichlorobenzyl peroxide., t-butyl peracetate 2,2'- azobis(isobutyramidine) dihydrochloride, azobisisobutyronitrile, hydrogen peroxide, redox system and ferrous sulfate is used.

9. The method for preparing a styrene-butadiene copolymer according to claim 1, wherein the initiator is used in an amount of 0.05-3 parts by weight based on 100 parts of the total reactants by weight.

10. The method for preparing a styrene-butadiene copolymer according to claim 1, wherein, in the radical emulsion polymerization, one or more of an anionic surfactant, a cationic surfactant and a non-ionic surfactant is used in addition to the reactive emulsifier represented by Chemical Formula 1, 2 or 3.

11. The method for preparing a styrene-butadiene copolymer according to claim 1, wherein the radical emulsion polymerization is performed at 0-80° C. for 1-48 hours.

12. A styrene-butadiene copolymer prepared by the method according to claim 1, which is represented by Chemical Formula 4, 5 or 6:

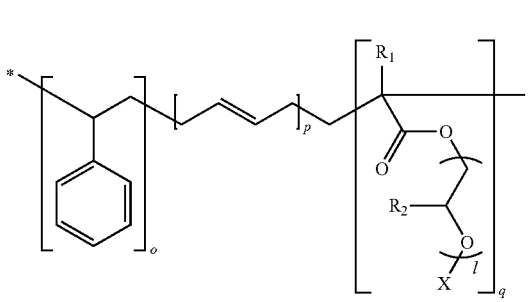

(4)

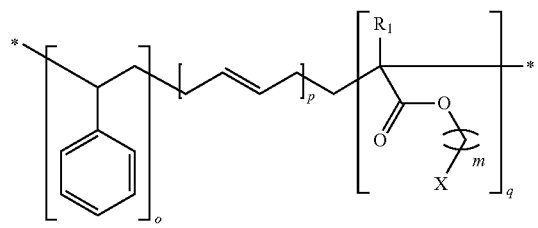

(5)

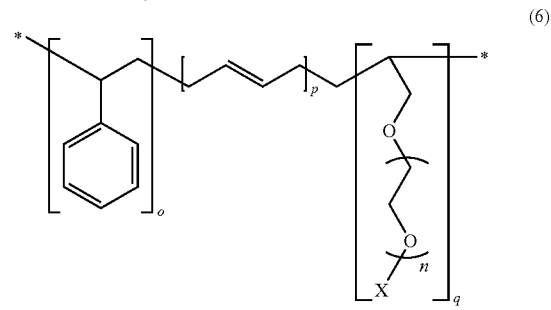

(6)

wherein each of $R_1$, $R_2$ and $R_3$ is independently hydrogen or a $C_1$-$C_6$ alkyl group, l is an integer from 1 to 20, m is an integer from 1 to 20, n is an integer from 1 to 20, X is an amino group, an ammonium group, a hydroxyl group, a sulfonate group, a carboxylate group or a phosphate group, o is from 0.1 to 0.5, p is from 0.40 to 0.85, q is from 0.01 to 0.10, and o+p+q=1.

13. A silica composite which is a mixture of the styrene-butadiene copolymer of claim 12 with silica.

14. The silica composite according to claim 13, wherein the styrene-butadiene copolymer and the silica are mixed at a ratio of 100:30-100 based on weight.

15. The silica composite according to claim 13, which is used as an industrial material for a tire, a hose or a belt.

* * * * *